United States Patent [19]

Taniguchi et al.

[11] Patent Number: 5,741,200

[45] Date of Patent: Apr. 21, 1998

[54] CONTROL APPARATUS FOR AN AUTOMATIC TRANSMISSION

[75] Inventors: Takao Taniguchi, Okazaki; Kazumasa Tsukamoto, Toyota; Masahiro Hayabuchi, Anjo; Masaaki Nishida, Anjo; Hiroshi Tsutsui, Nishio; Muneo Kusafuka, Anjo; Masamichi Unoki, Nishio; Junichi Nishimura, Anjo, all of Japan

[73] Assignee: Aisin AW Co., Ltd., Aichi-ken, Japan

[21] Appl. No.: 673,364

[22] Filed: Jun. 28, 1996

[30] Foreign Application Priority Data

Jun. 30, 1995 [JP] Japan ............................. 7-186707

[51] Int. Cl.$^6$ .................................................. B60K 41/20
[52] U.S. Cl. ............................ 477/93; 477/71; 477/114; 477/901
[58] Field of Search ......................... 477/71, 75, 92, 477/93, 114, 120, 121, 901, 904

[56] References Cited

U.S. PATENT DOCUMENTS

| | | | |
|---|---|---|---|
| 4,625,589 | 12/1986 | Nishikawa et al. | 477/92 |
| 4,625,591 | 12/1986 | Nishikawa | 477/93 |
| 4,644,826 | 2/1987 | Kubo et al. | |
| 4,648,289 | 3/1987 | Kubo et al. | |
| 4,719,821 | 1/1988 | Yagi et al. | 477/114 |
| 4,784,020 | 11/1988 | Hamano et al. | 477/114 X |
| 4,804,074 | 2/1989 | Kori | 477/901 X |
| 4,840,092 | 6/1989 | Sakaguchi et al. | 477/93 |
| 4,879,925 | 11/1989 | Taga et al. | |
| 5,148,721 | 9/1992 | Anan et al. | 477/121 X |
| 5,547,436 | 8/1996 | Hayabuchi et al. | 477/114 |
| 5,586,954 | 12/1996 | Iwata et al. | 477/93 |
| 5,598,335 | 1/1997 | You | 477/901 X |

FOREIGN PATENT DOCUMENTS 59-29861  2/1984  Japan.

Primary Examiner—Khoi Q. Ta
Assistant Examiner—Peter T. Kwon
Attorney, Agent, or Firm—Oliff & Berridge

[57] ABSTRACT

The invention provides a control apparatus for an automatic transmission for carrying out neutral control and hill-hold control in a range that causes no slip of a hill-hold brake. The control apparatus has a judgment unit for determining, in accordance with a signal output by a gradient detector whether an uphill road is steep enough to cause a hill-hold brake to slip with the hill-hold brake engaged, a hydraulic pressure reducing device for reducing the hydraulic pressure applied to a hydraulic servo of a clutch in order to place the clutch in an all but released state, a hydraulic pressure applying device for applying a hydraulic pressure to a hydraulic servo of a brake in order to engage the brake, and an execution unit for permitting the hydraulic pressure reducing device to reduce the hydraulic pressure applied to the hydraulic servo and the hydraulic pressure applying device to apply a hydraulic pressure to the hydraulic servo only if a stop, or halted, state is detected by a stop-state detector and an uphill road is determined by the judgement unit not to be steep enough to cause the hill-hold brake to slip.

7 Claims, 11 Drawing Sheets

|  | CLUTCH | | | BRAKE | | | | ONE-WAY CLUTCH | | |
|---|---|---|---|---|---|---|---|---|---|---|
|  | C1 | C2 | C3 | B1 | B2 | B3 | B4 | F1 | F2 | F3 |
| R | X | O | X | X | X | O | O | X | X | X |
| N | X | X | X | X | X | X | O | X | X | X |
| D 1ST | O | X | X | X | X | (O) | O | X | O | O |
| D 2ND | O | X | X | O | O | X | O | O | X | O |
| D 3RD | O | X | O | O | O | X | X | O | X | X |
| D 4TH | O | O | O | X | O | X | X | X | X | X |

FIG.3

| THROTTLE OPEN (%) / EXAMINE SPEED (RPM) | 0 | 111 | 167 | 222 |
|---|---|---|---|---|
| 1000 | 5 | 70 | 100 | 115 |
| 1500 | 0 | 80 | 95 | 120 |
| 2000 | 0 | 55 | 85 | 115 |
| 2500 | 0 | 40 | 75 | 110 |
| 3000 | 0 | 35 | 50 | 90 |

FIG.12

TORQUE RATIO

| SPEED RATIO | TORQUE RATIO |
|---|---|
| 0 | 2.5 |
| 0.1 | 2.0 |
| 0.2 | 1.9 |
| 0.3 | 1.8 |
| 0.4 | 1.6 |
| 0.5 | 1.5 |
| 0.6 | 1.3 |
| 0.7 | 1.2 |
| 0.8 | 1.0 |
| 0.9 | 1.0 |
| 1.00 | 1.0 |

FIG.13

RUN RESISTANCE MAP

| VEHICLE SPEED | 0 | 10 | 20 | 30 | 40 | 50 | 60 | 70 | 80 | 90 | 100 |
|---|---|---|---|---|---|---|---|---|---|---|---|
| RUN RESISTANCE FLAT ROAD | 265 | 270 | 280 | 300 | 330 | 360 | 400 | 460 | 520 | 580 | 660 |

FIG.14

LOSS MAP

| GEAR RATIO | 1st | 2nd | 3rd | 4th |
|---|---|---|---|---|
| GEAR LOSS | 39.0 | 35.5 | 41.5 | 45.5 |

FIG.15

BASE OFFSET

| THROTTLE OPENING (%) / GEAR RATIO | 0 | 10 | 20 | 30 | 40 | 50 |
|---|---|---|---|---|---|---|
| 2nd | 0 | 0 | 0 | 0.2 | 0.3 | 0.4 |
| 3rd | 0 | 0 | 0 | 0.1 | 0.2 | 0.3 |
| 4th | 0 | 0 | 0 | 0.1 | 0.2 | 0.2 |

FIG.16

CONTROL APPARATUS FOR AN AUTOMATIC TRANSMISSION

BACKGROUND OF THE INVENTION

1. Field of the Invention

In general, the invention relates to a control apparatus for an automatic transmission. In particular, the invention relates to a control apparatus for carrying out neutral control and hill-hold control for an automatic transmission.

2. Description of the Prior Art

An automatic transmission comprises a fluid transmission gear and a transmission apparatus. When a running range is selected, the fluid transmission gear is put in a rotation transmission state through fluid while the transmission apparatus is put in a mechanically linked rotation transmission state. If the vehicle is halted by applying a braking force to the wheels in these states, the transmission apparatus is also halted by the braking force, staying in the rotation transmission state as it is. As a result, the engine is allowed to rotate through fluid sliding in the fluid transmission gear, causing power loss to be incurred in an amount determined by the fluid sliding. With the vehicle in a halted state, even in a selected running range, a clutch in the transmission apparatus is released and placed in a state immediately before engagement for the next start. Such a state is referred to as an all but released state in the this specification. The transmission apparatus itself is placed in a power cut-off state, reducing the load of the engine required for the fluid sliding in the fluid transmission gear, in the so-called neutral control, in order to avoid power loss corresponding to the fluid sliding and to enhance fuel-consumption efficiency.

When the neutral control is being carried out, by the way, a creep force, based on power transmission through the fluid in the fluid transmission gear, can no longer be expected. As a result, when a braking force output by a braking apparatus for halting the vehicle on an uphill road or slope is reduced, the vehicle retreats or rolls back, i.e., rolls downhill. In order to prevent such a vehicle retreating phenomenon from occurring, the reverse rotation of the transmission apparatus, as driven by the wheels, is avoided in the so-called hill-hold control to prevent the vehicle from retreating. With the hill-hold control, a specific brake in the transmission apparatus is engaged and a one-way clutch is locked so as to place the transmission apparatus in a state that stops the reverse rotation of the transmission apparatus.

A conventional technology for carrying out the neutral control in conjunction with the hill-hold control described above is disclosed in Japanese Patent Laid-open No. Sho 59-29861. According to this conventional technology, a vehicle speed sensor outputs a detection signal in response to the detection of the vehicle speed having gone below a predetermined value whereas a halt-operation detecting sensor outputs a detection signal in response to the detection of the operation of stopping the vehicle. When both of the sensors output the detection signals, a controller outputs a signal for activating an electromagnetic means in order to release an input clutch and to lock the brake. That is to say, according to this conventional technology, when all three signals indicate the application of a brake apparatus, a released state of the acceleration pedal and a vehicle speed of virtually zero respectively, both the neutral control and the hill-hold control are started.

When the neutral control and the hill-hold control described above are carried out on a vehicle halted on an uphill road with a steep gradient, however, the force for engaging a hill-hold brake is not sufficient in some cases. In such a case, the hill-hold brake slips, giving rise to a problem that jitter (or vibration) occurs. Jitter is a phenomenon wherein a friction material is engaged and released repeatedly at an extremely short interval.

SUMMARY OF THE INVENTION

The invention addresses the problem described above. It is a first object of the invention to provide a control apparatus for an automatic transmission whereby neither the neutral control nor the hill-hold control are carried out for an uphill road with too steep a gradient and the neutral control as well as the hill-hold control can be performed to such an extent that a hill-hold brake does not slip while preventing the vehicle from retreating so as to allow the fuel-consumption efficiency to be increased as much as possible.

It is a second object of the invention to prevent jitter from occurring due to a slip of the hill-hold brake by optimizing the judgment made by the control apparatus described above to determine that an uphill road on which the vehicle is halted is steep enough to cause the hill-hold brake to slip.

It is a third object of the invention to optimize the timing with which the control apparatus described above abstains from determining that the uphill road is steep.

It is a fourth object of the invention to carry out neutral control and hill-hold control by properly judging a range causing no slip to occur from information on the gradient of a road obtained in advance by detecting the gradient of the road on which the vehicle is running.

When the neutral control and the hill-hold control are started at the same time, the engagement of the brake for the hill-hold control is delayed by a time required by for a piston to make a stroke but, on the other hand, a clutch is released quickly. As a result, both the force output by the hill-hold control to resist the retreating movement of the vehicle and the creep force output by the clutch engagement may not function properly. At least one of the brake and clutch may be engaged to stop roll back but when one is released before the other is engaged on an uphill slope, the car will roll back. In this case, carrying out the neutral control and the hill-hold control at a time the vehicle is halted on an uphill road may cause the vehicle to retreat. The invention addresses this problem.

It is a fifth object of the invention to carry out the neutral control and the hill-hold control in a range not causing a slip to occur, as described above, in such a way that, in the case of a gradual uphill road, the hill-hold control is performed first in order to prevent the vehicle from retreating and, if an uphill road is not steep enough to cause the vehicle to retreat, the neutral control and the hill-hold control are performed at the same time. By limiting the time, by which the start of the neutral control is delayed, to a minimum required period, a maximum effect of enhancing the fuel-consumption efficiency can be obtained.

It is a sixth object of the invention to reduce the minimum period to a value in a range not causing the vehicle to retreat.

Finally, it is a seventh object of the invention to consider the calculation of a desired acceleration used in detecting the gradient of the road on which the vehicle is running, in the control apparatus described above, so that the desired acceleration matches the type or state of the vehicle.

In order to achieve the first object described above, the invention provides a control apparatus for an automatic transmission of a vehicle comprising a fluid transmission gear for transmitting the rotation of an engine to transmission apparatuses; a clutch which is engaged when a forward running range is selected to couple the fluid transmission gear to the transmission apparatuses; a one-way clutch which is locked by engagement of the clutch to achieve a forward first speed of the transmission apparatuses; a brake for locking the one-way clutch by the engagement in order to prevent an output shaft of the transmission apparatuses from rotating in the reverse direction; a first hydraulic servo for engaging the clutch by a hydraulic pressure applied thereto; a second hydraulic servo for engaging the brake by a hydraulic pressure applied thereto; a stop-state detecting means for determining that the vehicle is in a stop state when the vehicle speed is virtually zero, an acceleration pedal is released and a foot-brake pedal is stepped on; a gradient detecting means for detecting the gradient of a road; and a control means for controlling hydraulic pressures applied to the first and second hydraulic servos in accordance with signals generated by the stop-state detecting means and the gradient detecting means, wherein the control means comprises a judgment means for determining, in accordance with the signal output by the gradient detecting means, whether an uphill road is steep enough to cause a brake to slip with the brake engaged; hydraulic pressure reducing means for reducing the hydraulic pressure applied to the first hydraulic servo in order to place the clutch in an all but released state; hydraulic pressure applying means for applying a hydraulic pressure to the second hydraulic servo in order to place the brake in an engaged state; and execution means for permitting the hydraulic pressure reducing means to reduce the hydraulic pressure applied to the first hydraulic servo and the hydraulic pressure applying means to apply a hydraulic pressure to the second hydraulic servo only if a stop state is detected by the stop-state detecting means and the judging means determines that an uphill road is not steep enough to cause the brake to slip.

Furthermore, in order to achieve the second object described above, the invention provides a structure wherein the gradient detecting means comprises vehicle speed detecting means for detecting the speed of a vehicle; acceleration pedal detecting means for detecting a stepped-on state of an acceleration pedal; and brake detecting means for detecting a stepped-on state of the foot brake, and the judgment means determines that an uphill road is steep enough to cause the brake to slip if, in a state in which the execution means permits the hydraulic pressure applied to the first hydraulic servo be reduced and a hydraulic pressure be applied to the second hydraulic servo, the gradient detecting means detects that the speed of the vehicle has become virtually a non-zero value with the brake pedal stepped on and the acceleration pedal released.

In addition, in order to achieve the third object described above, the invention provides a structure wherein, when the acceleration pedal detecting means detects that the acceleration pedal is stepped on, the judgment means abstains from judging that an uphill road is steep enough to cause the brake to slip.

Further, in order to achieve the fourth object described above, the invention provides a structure wherein the gradient detecting means comprises an acceleration detecting means for detecting an actual acceleration of a vehicle and a running-state detecting means for detecting a running state of the vehicle, and the judgment means carries out the steps of calculating a desired acceleration of the vehicle for a flat road in accordance with the running state of the vehicle; comparing the calculated desired acceleration with the actual acceleration; and determining that an uphill road is steep enough to cause the brake to slip if the actual acceleration is found to be smaller than the calculated desired acceleration by a difference equal to or greater than a predetermined first comparison value.

In addition, in order to achieve the fifth object described above, the invention provides a structure wherein, if the actual acceleration is not found to be smaller than the desired acceleration by a difference equal to or greater than the first predetermined comparison value but is found to be smaller than the desired acceleration by a difference equal to or greater than a second predetermined comparison value set, the judgment means determines that the uphill road is gradual. When the vehicle is detected by the stop-state detecting means to be in a halted or stopped state, the execution means permits the hydraulic pressure applying means start to apply a hydraulic pressure to the second hydraulic servo and, after a predetermined time has lapsed, permits the hydraulic pressure reducing means to start to reduce the hydraulic pressure applied to the first hydraulic servo if the uphill road is determined by the judgment means to be gradual, or the execution means permits the hydraulic pressure applying means to start to apply a hydraulic pressure to the second hydraulic servo and permits the hydraulic pressure reducing means to start to reduce the hydraulic pressure applied to the first hydraulic servo at the same time if the uphill road is determined by the judgment means to be neither steep nor gradual.

Furthermore, in order to achieve the sixth object described above, the invention provides a structure wherein the predetermined time is set at a value which is at least as long as a time required to complete the engagement of the brake.

In addition, in order to achieve the seventh object described above, the invention provides a structure wherein the actual running-state detecting means at least detects an input torque applied to the transmission apparatuses, an engaged gear of the transmission apparatuses and the speed of a vehicle and the judgment means calculates a desired acceleration of the vehicle for a flat road in accordance with the input torque, the engaged gear of the transmission apparatuses and the speed of the vehicle.

In the invention, by releasing the clutch and engaging the brake only if the gradient of a road is such that it does not cause a slip of the brake to occur, the vehicle is prevented from retreating due to the releasing of the clutch in a range causing no jitter to occur because of the slipping of the brake, giving rise to a maximum effect of increasing the efficiency of the fuel consumption by virtue of the neutral control.

When the speed of the vehicle is detected to be not zero when the brake pedal is stepped on and the acceleration pedal released, the vehicle is judged to be in a retreating movement due to a slip of the hill-hold brake. Then, by not releasing the clutch and not engaging the brake in accordance with this judgment, jitter can be prevented from occurring due to a slip of the brake. In this way, the possibility of repetitive occurrence of a slip of the hill-hold state because of re-execution of the neutral control and the hill-hold control upon re-detection of a halted state of the vehicle due to the transient releasing of the neutral control, as is the case with the continuous execution of the neutral control and the hill-hold control, can be avoided. Accordingly, according to this structure, a steep uphill road can be detected by using signals output by simple detection means, such as an acceleration pedal signal, a signal representing the speed of the vehicle and a foot-brake signal, to prevent jitter from being generated due to the slipping of the brake with a high degree of reliability.

In addition, because a timing to abstain from judging that the uphill road is steep can be obtained from the stepped-on state of the acceleration pedal, it is possible to abstain properly from judging that the uphill road is steep with ease by sensing a signal output by a simple detection means.

Further, as the gradient of the road can be detected while the vehicle is running, when the halted state of the vehicle is detected at the time the vehicle is halted, the gradient of the road is already known and a steep uphill road, that can cause the brake to slip, is also properly identified at that time so that, in the case of such a steep uphill road, the neutral control and the hill-hold control can be kept in an inactivated state. As a result, with this structure, the neutral control and the hill-hold control can be carried out, only for a range that does not cause the brake to slip, with a high degree of reliability.

With respect to the execution of the neutral control and the hill-hold control in a range not causing a slip to occur, in the case of a gradual uphill road, the hill-hold control is performed first and, if an uphill road is gradual enough to prevent the vehicle from retreating, the neutral control and the hill-hold control are carried out at the same time. When the neutral control and the hill-hold control are started at the same time, in general, the engagement of the brake for the hill-hold control is delayed by a time required by the piston to make a stroke but, on the other hand, the clutch is released quickly. As a result, a state in which both the force output by the hill-hold control to resist the retreating movement of the vehicle and the creep force output by the clutch engagement do not work may result. However, the state in which both the force output by the hill-hold control to resist the retreating movement of the vehicle and the creep force output by the clutch engagement do not work can be avoided because the neutral control and the hill-hold control are performed at the same time only in the case of an uphill road with such a small gradient that the vehicle does not retreat as described above. Thus, by suppressing a period during which the neutral control is not carried out to a minimum, the maximum effect of enhancing the fuel-consumption efficiency by means of the neutral control can be obtained.

In addition, the clutch is released after the brake has been engaged. In this way, the clutch is always released in a state wherein a hill-hold force is output so that the vehicle never retreats.

Lastly, when calculating a desired acceleration, the input torque to the transmission apparatuses and the speed of the vehicle, which are affected by a gear ratio obtained from the engaged gear of the transmission apparatuses and the running resistances, such as the air resistance, are taken into consideration. As a result, a desired acceleration that matches the state of the vehicle can be calculated.

BRIEF DESCRIPTION OF THE DRAWINGS

The invention will be described with reference to the figures, in which:

FIG. 3 is a diagrammatic table showing the operations of the automatic transmission shown in FIG. 2;

FIG. 12 is an examplary map for determining engine torque;

FIG. 13 is an examplary map for determining the torque ratio from the engine ratio;

FIG. 14 is an examplary map for determining run resistance on a flat road;

FIG. 15 is an examplary map for determining a gear loss; and

FIG. 16 is an examplary map for determining a correction factor for the reference acceleration.

DESCRIPTION OF THE PREFERRED EMBODIMENTS

Figure 2:
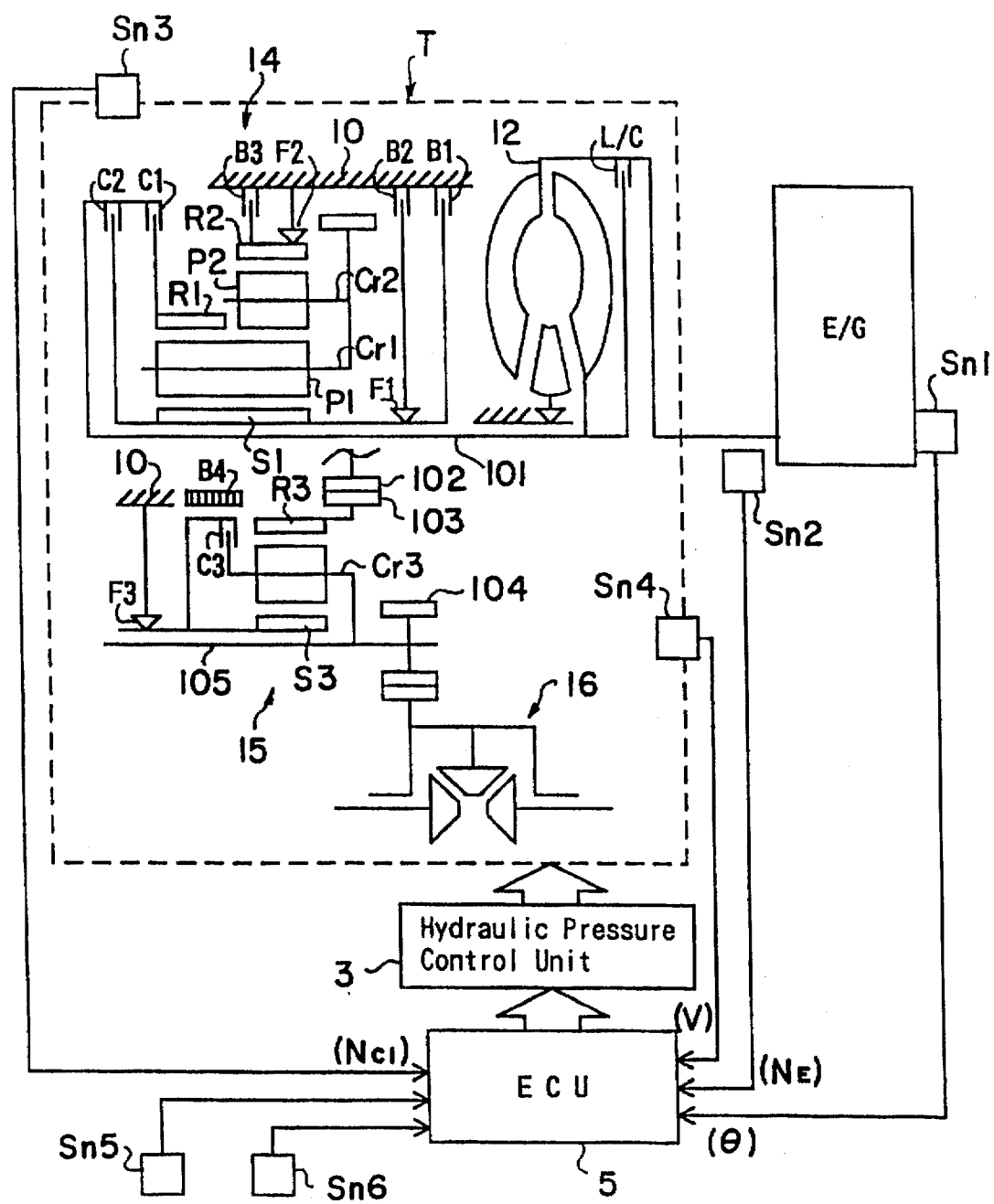
FIG. 2 is a schematic diagram showing only the mechanism in the structure of an automatic transmission as implemented by the first embodiment shown in FIG. 1.

The invention will become apparent from the following detailed description of preferred embodiments with reference to accompanying diagrams. FIG. 2 is a schematic diagram illustrating the mechanism of an embodiment implementing an automatic transmission in accordance with the invention with a control apparatus thereof drawn conceptually as blocks.

The control apparatus of the automatic transmission comprises a fluid transmission gear 12 for transmitting the rotation of an engine E/G to transmission apparatuses 14 and 15, a clutch C1 which is engaged to couple the fluid transmission gear 12 to the transmission apparatuses 14, 15 when a forward running range is selected, a one-way clutch F2 locked by the engagement of the clutch C1 for achieving a forward 1st gear ratio output by the transmission apparatuses 14, 15, and a brake B1 for locking the one-way clutch F2 through the engagement in order to prevent an output shaft 105 of the transmission apparatuses 14, 15 from rotating in the reverse direction.

Figure 1:
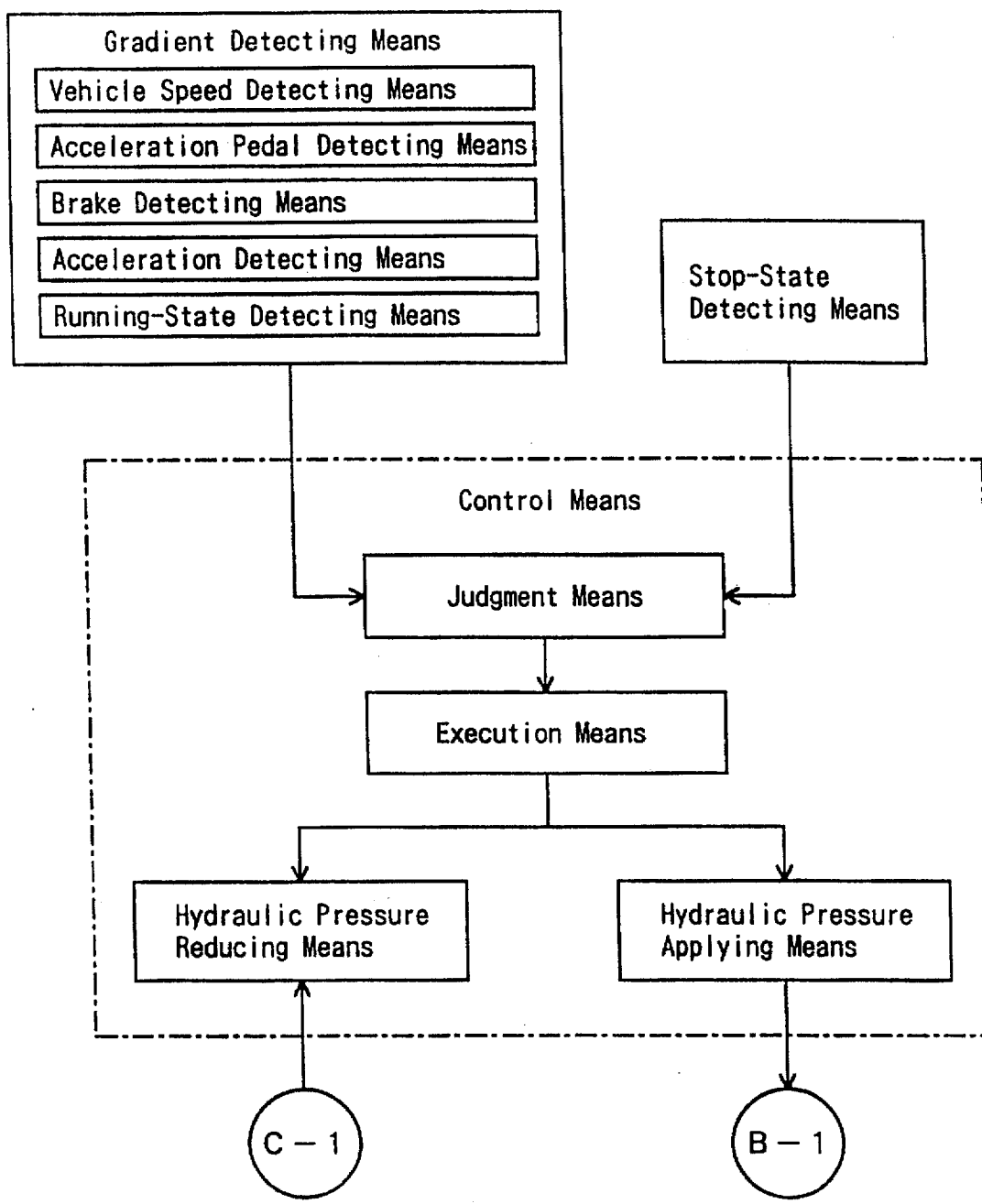
FIG. 1 is a block diagram showing conceptually a first embodiment of the invention.

As shown by a block diagram in FIG. 1, the control apparatus further comprises a first hydraulic servo C-1 for engaging the clutch C1 by applying hydraulic pressure thereto, a second hydraulic servo B-1 for engaging the brake B1 by applying hydraulic pressure thereto, stop-state detecting means for determining that the vehicle is in a halted or stopped state when the speed of the vehicle is virtually zero, the acceleration pedal is released and the foot-brake pedal is stepped on, a gradient detecting means for detecting the gradient of a road, and control means for controlling hydraulic pressures applied to the first and second hydraulic servos C-1, B-1 in accordance with signals generated by the stop-state detecting means and the gradient detecting means.

The control means comprises judgment means for determining, in accordance with the signal output by the gradient detecting means, whether an uphill road is steep enough to cause the brake B1 to slip when engaged, hydraulic pressure reducing means for reducing the hydraulic pressure applied to the first hydraulic servo C-1 in order to place the clutch C1 in an all but released state, hydraulic pressure applying means for applying a hydraulic pressure to the second hydraulic servo B-1 in order to place the brake B1 in an engaged state, and execution means for permitting the hydraulic pressure reducing means to reduce the hydraulic pressure applied to the first hydraulic servo C-1 and the hydraulic pressure applying means apply the hydraulic pressure to the second hydraulic servo B-1 only if a halted state is detected by the stop-state detecting means and the judging means determines that an uphill road is steep enough to cause the brake B1 to slip.

In the following description of the embodiment, an uphill road steep enough to cause the brake B1 to slip, with the brake B1 engaged, is referred to as a steep uphill road while an uphill road determined by the judging means not to be steep enough to cause the brake B1 to slip is referred to as a gradual uphill road.

The gradient detecting means comprises vehicle speed detecting means Sn4 for detecting the speed of the vehicle, acceleration pedal detecting means Sn1 for detecting the stepped-on state of the acceleration pedal, and brake detecting means Sn6 for detecting the stepped-on state of a foot brake. For details of the vehicle speed detecting means Sn4, refer to FIG. 2 which also shows other detection means as well.

The judgment means determines that the road is a steep uphill road if, with the execution means permitting the hydraulic pressure applied to the first hydraulic servo C-1 to be reduced and a hydraulic pressure to be applied to the second hydraulic servo B-1, the gradient detecting means detects that the speed of the vehicle has become virtually a non-zero value with the brake pedal depressed and the acceleration pedal released. When the acceleration detecting means detects that the acceleration pedal is depressed, the judgment means abstains from judging that the road is a steep uphill road.

Details of each element are shown in FIG. 2. The automatic transmission T, implemented by this embodiment, includes a forward-four-ratio/reverse-one-ratio gear train for a vehicle of the front-engine/front-drive type. As shown in the figure, the automatic transmission T comprises a torque converter 12 with a lock-up clutch L/C which serves as the fluid transmission gear 12 (previously discussed), a gear train with a two-shaft structure comprising a main transmission unit 14, serving as the first transmission apparatus, and a planetary gear unit 15, serving as the second transmission apparatus, with an under-drive structure, a differential gear 16, a hydraulic pressure control unit 3 serving as a control means for controlling the gear train and the lock-up clutch L/C and an electronic control unit (ECU) 5 serving as a control means for controlling the hydraulic pressure control unit 3.

It should be noted that Sn1, shown in the figure, denotes a throttle sensor for detecting the throttle opening ($\theta$) of the engine E/G. In this embodiment, the throttle sensor Sn1 serves as an acceleration pedal detecting means for detecting the operation of the acceleration pedal. Sn2 denotes an engine rotation sensor for detecting the rotational speed $N_E$ of the engine E/G. Sn3 denotes a clutch C1 rotation sensor for detecting the rotational speed Nc1 of the clutch C1 of the automatic transmission T. Sn4 is a vehicle speed sensor serving as a vehicle speed detecting means for detecting the vehicle speed V also from an output rotational speed. Sn5 denotes a neutral start switch for detecting a shift position and Sn6 is a brake switch serving as a brake detecting means for detecting the operation of the brake pedal. The electronic control unit 5 serves as a control computer which executes a built-in program in order to generate control signals to an on-off solenoid valve and a linear solenoid valve of the hydraulic control apparatus 3 in accordance with information received from the sensors described above, mainly the vehicle speed V (Sn4) and the throttle opening $\theta$ (Sn1).

The main transmission unit 14 of the gear train of the automatic transmission T comprises a planetary gear unit having a single-pinion structure and a planetary gear unit having a double-pinion structure. Both of the planetary gear units comprise a structure assembled by linking a carrier Cr1 for supporting a sun gear S1, the planetary gear unit on the single-pinion side and one of pinion gears P1 on the double-pinion side as a single body to a carrier Cr2 for supporting the other pinion gear P2 on the double-pinion side. In addition, the sun gear S1, common to both the planetary gear units of the main transmission unit 14, can be fixed to a transmission case 10 through the brake B1 or through a one-way clutch F1 and a brake B2 which are arranged in series. A ring gear R1, on the single-pinion side, and the sun gear S1 are connected through the clutch C1 and a clutch C2 respectively to an input shaft 101 which is linked to a turbine output shaft of the torque converter 12. The carrier Cr1, supporting the pinion gear P1 engaged with the sun gear S1, the ring gear R1 and the pinion gear P2, and the carrier Cr2, supporting the pinion gear P2 engaged with the pinion gear P1 and a ring gear R2, are linked to each other and connected to a counter gear 102. The ring gear R2 on the double-pinion side can be fixed to the transmission case 10 through a brake B3 and the one-way clutch F2 which are arranged in parallel to each other.

On the other hand, a ring gear R3 employed in the under-drive planetary gear unit 15 serves as an input element which is connected to the main transmission unit 14 through the counter gear 102 and a counter gear 103. A carrier Cr3 and a sun gear S3 are connected to each other through a clutch C3. The sun gear S3 can be fixed to the transmission case 10 through a one-way clutch F3 and a hand brake B4 which are arranged in parallel to each other. The carrier Cr3 is linked to an output gear 104 on the side of the differential gear 16.

In the gear train having the structure described above, with the clutch C3 of the under-drive planetary gear unit 15 released, the brake B4 engaged and the sun gear S3 stopped, under an under-drive rotation resulting from an output produced by the carrier Cr3 which is transformed from an input of the ring gear R3, the input to the ring gear R1 by the engagement of the clutch C1 of the main transmission unit 14 is output in one of the following ways:

- as rotations of the carriers Cr1 and Cr2 by the reactive-force support of the ring gear R2 due to a locked state of the one-way clutch F2, attaining a 1st gear ratio;
- as rotations of the carriers Cr1 and Cr2 by a stopped state of the sun gear S1 due to the engagement of the brake B2, attaining a 2nd gear ratio;
- from the carriers Cr1 and Cr2 as an input rotation as it is in a directly connected state of the main transmission unit 14 due to the same rotation of the ring gear R1 and the sun gear S1 because of the additional engagement of the clutch C2, attaining a 3rd gear ratio;

in a directly connected state of the under-drive planetary gear unit 15 due to the releasing of the brake B4 and the engagement of the clutch C3, attaining a 4th gear ratio; and as a rotation of the carrier Cr2 in the reverse direction because of the input of the sun gear S1 and the stopped state of the ring gear R2 due to the engagement of the clutch C2 and the brake B3, attaining a reverse gear ratio.

In addition, in this gear train in particular, when an attempt is made to drive the output shaft 105 of the under-drive planetary gear unit 15 and the counter gear 102 of the main transmission unit 14, linked to the output shaft 105, in the reverse direction during a retreating movement of the vehicle or roll back, the one-way clutch F2 is locked and the ring gear R2 is stopped due to the engagement of the brake B1 and the stopped state of the sun gear S1, avoiding a relative reverse-direction rotation of both the pinion gears P1 and P2 which are engaged with each other and, thus, avoiding a reverse-direction rotation caused by the reverse-direction driving attempt.

FIG. 3 is a table summarizing the relationships between the states of the clutches, the brakes and the one-way clutches described above and transmission-gear stages, that is, the 1st to 4th gear ratios which can be achieved in the drive range position. Notations "R", "N" and "D" denote the reverse, neutral and drive range positions respectively. Notations O and X denote engaged and released states respectively. It should be noted that, in the case of a one-way clutch, notation O indicates a locked state. In addition, notation (O) denotes an engaged state only for an engine brake.

A hydraulic circuit serving as a control means for controlling the gear train having the structure described above is shown in FIG. 4. As shown in the figure, much like the hydraulic circuit of the conventional hydraulic control apparatus, the hydraulic circuit comprises an oil pump PUMP, a variety of pressure regulators, such as a primary regulator valve 31 and a secondary regulator valve (not shown in the figure), a manual valve 32, a variety of solenoid valves, such as a linear solenoid valve 34 and a solenoid valve 36, and a variety of shift valves, orifices and check valves provided in the hydraulic circuit for connecting the valves, to mention a few. The oil pump PUMP serves as a hydraulic pressure source. The primary regulator valve 31 adjusts the discharge pressure thereof to a predetermined and stable line pressure $P_L$ in accordance with the speed of the vehicle and the throttle opening. A secondary pressure output by the primary regulator valve 31 is further adjusted to a low pressure applied to a torque converter by the secondary regulator valve which also outputs a residual pressure as a lubrication pressure.

Figure 4:
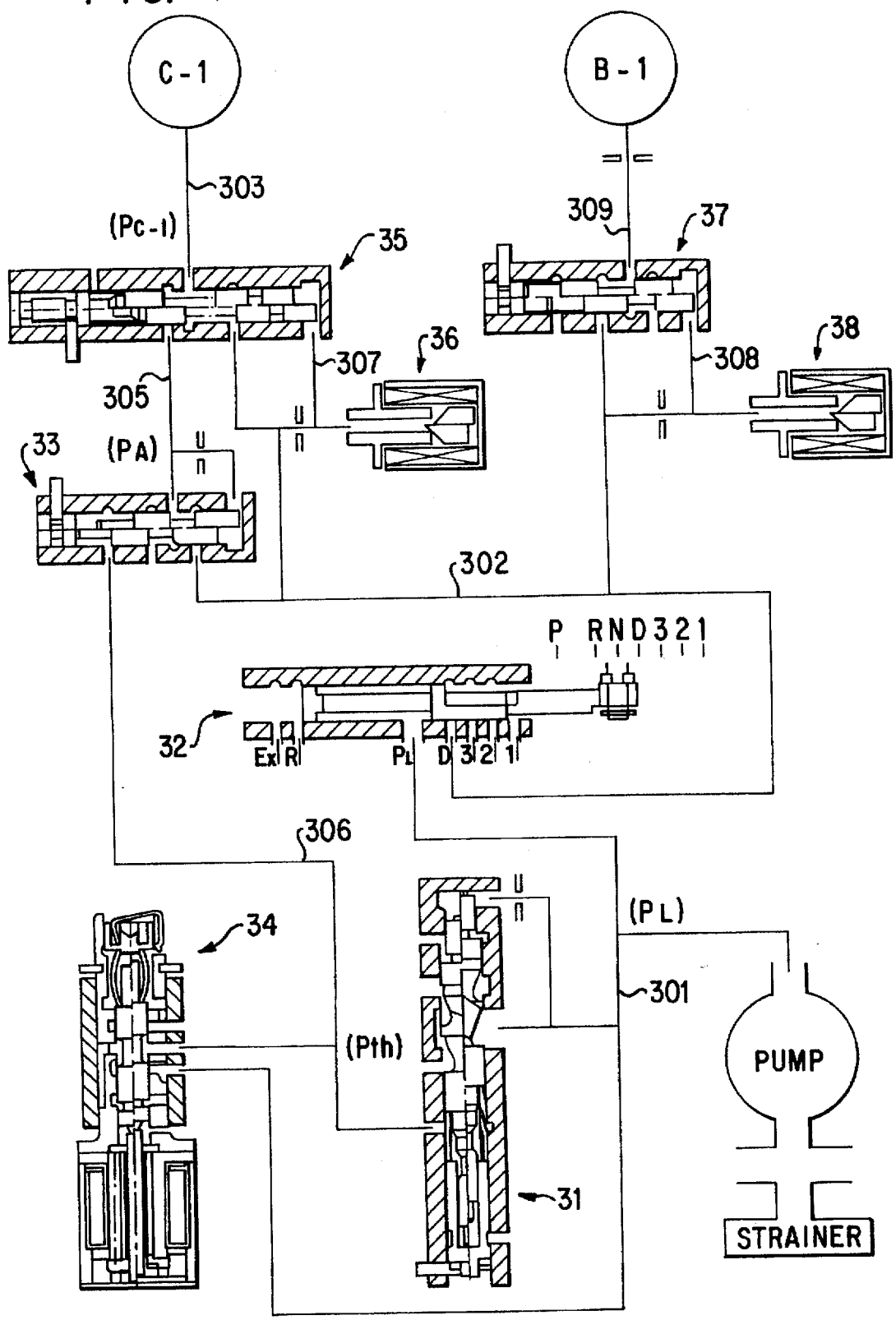
FIG. 4 is a circuit diagram showing the components of the hydraulic apparatus of the automatic transmission shown in FIG. 2.

FIG. 4 shows only portions in the hydraulic circuit which are directed to the problems solved by the invention. As shown in the figure, the hydraulic circuit includes the manual valve 32, a C-1 control valve 33, the linear solenoid valve 34 for controlling the C-1 control valve 33, a C-1 switch valve 35, the solenoid valve 36 for controlling the C-1 switch valve 35, a B-1 switch valve 37 and a solenoid valve 38 for controlling the B-1 switch valve 37. The manual valve 32 has an input port and an output port thereof connected to a line pressure oil path 301 and a D-range pressure oil path 302 respectively. As described above, the line pressure $P_L$ at the input port is adjusted by the primary regulator valve 31 in accordance with the throttle opening (θ) prevailing at every point of time as a D-range pressure, once a forward-running range, that is, the D range is selected.

A throttle signal pressure Pth and the feedback pressure of an adjusted hydraulic pressure $P_A$ applied to the clutch C1 are applied to spool terminals of the C-1 control valve 33 as pressures facing each other. The C-1 control valve 33 functions as a pressure reducing valve carrying out a secondary pressure operation to adjust the degree of opening/closing of each of the output, input and drain ports. The input and output ports are connected to a D-range pressure oil path 302 and an adjusted hydraulic output oil path 305 respectively. A signal port of the C-1 control valve 33 is connected to a throttle signal pressure oil path 306. A feedback port of the C-1 control valve 33 is connected to the adjusted hydraulic output oil path 305 through an orifice. The linear solenoid valve 34 reduces the line pressure $P_L$ used as a base pressure in accordance with a signal output by the electronic control unit 5, outputting the throttle signal Pth which is applied to the primary regulator valve 31 and the C-1 control valve 33 through the throttle signal pressure oil path 306. In this way, the C-1 control valve 33 and the linear solenoid valve 34 perform the functions of a pressure reducing means for reducing the adjusted hydraulic pressure $P_A$ to a hydraulic pressure $P_{C-1}$ applied to a hydraulic servo C-1 in accordance with the signal output by the electronic control unit 5.

The C-1 switch valve 35 serves as a spool-type switch valve for selectively passing on an oil flow from an input thereof connected to the adjusted hydraulic output oil path 305 or an input thereof connected to the D-range pressure oil path 302 to an output port thereof which is connected to the hydraulic servo C-1 of the clutch C1. A solenoid signal pressure resisting a spring force serving as a load at the spoon terminal of the C-1 switch valve 35 causes the C-1 switch valve 35 to selectively switch from one input port to another and vice versa. The solenoid valve 36 is an on/off valve of a normally-open type which is closed by a solenoid signal output by the electronic control unit 5 in order to drain and stop the hydraulic pressure of a solenoid signal pressure oil path 307 which is connected to the D-range pressure oil path 302 through an orifice. In this way, the C-1 switch valve 35 and the solenoid valve 36 carry out a switching function to selectively switch from a supply position (that is, a position on the lower-half side of the figure for the C-1 switch valve 35 and the upper-half side of the solenoid valve 36) for applying the line pressure $P_L$ to the hydraulic servo C-1 of the clutch C1 through an oil path 303 to an exhaust position (that is, a position on the upper-half side of the figure for the C-1 switch valve 35 and the lower-half side of the solenoid valve 36) for reducing the adjusted hydraulic pressure $P_A$ to the hydraulic pressure $P_{C-1}$ and vice versa in accordance with a signal output by the electronic control unit 5, serving as a hydraulic pressure reducing means provided by the invention in conjunction with the C-1 control valve 33 and the linear solenoid valve 34.

The B-1 switch valve 37 is a spool-type switch valve having an input port connected to the D-range pressure oil path 302, an output port connected to a hydraulic servo B-1 through an orifice, and a drain port. A solenoid signal pressure resisting a spring force serving as a load at a spool terminal of the B-1 switch valve 37 causes the B-1 switch valve 37 to actuate. The solenoid valve 38 is an on/off valve of a normally-open type which is closed by a solenoid signal output by the electronic control unit 5 in order to drain and stop the hydraulic pressure of a solenoid signal pressure oil path 308 which is connected to the D-range pressure oil path 302 through an orifice. In this way, the B-1 switch valve 37 and the solenoid valve 38 serve as a hydraulic pressure applying means provided by the invention for carrying out a switching function to selectively switch from a supply position (that is, a position on the upper-half side of the figure) for applying the line pressure $P_L$ to the hydraulic servo B-1 of the brake B1 through an oil path 309 to an exhaust position (that is, a position on the lower-half side of the figure) for drain-connecting the oil path 309 and vice versa in accordance with a signal output by the electronic control unit 5.

Figure 5:
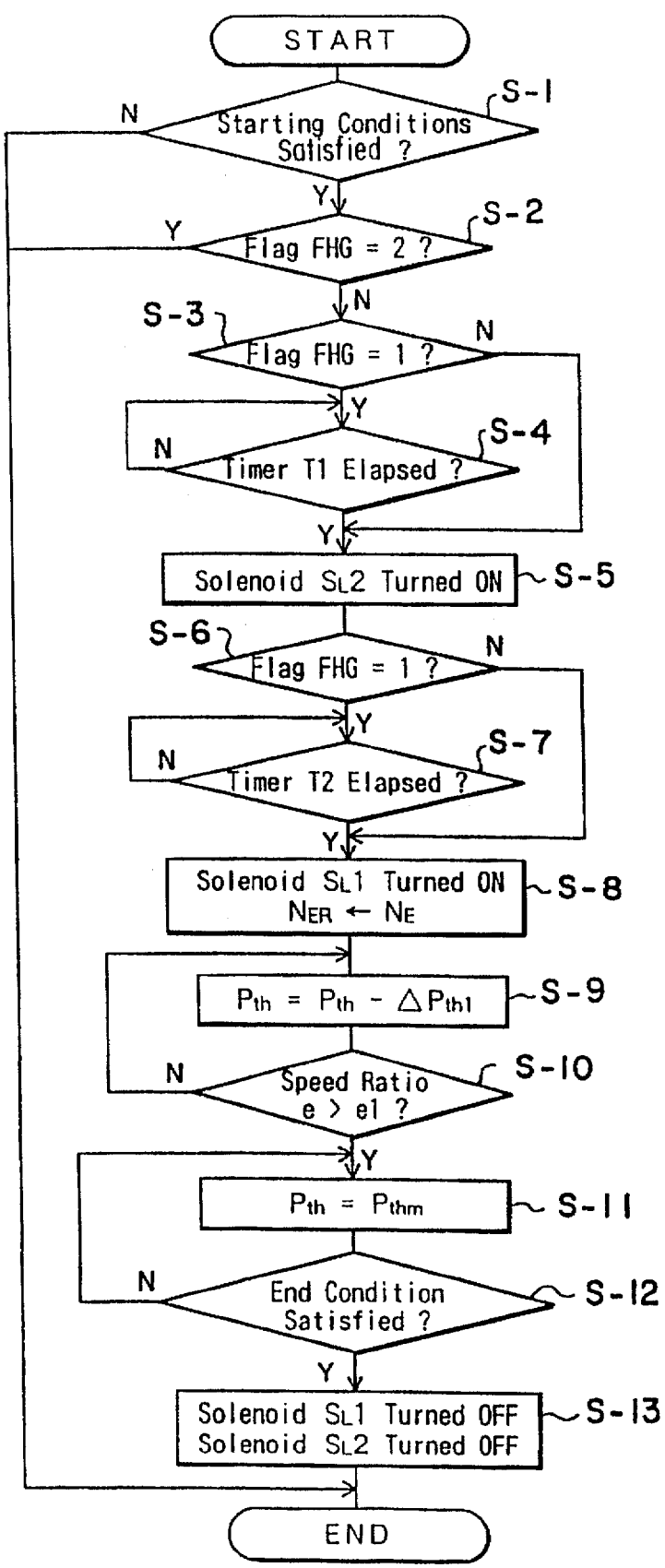
FIG. 5 is a flowchart showing a main flow of a control apparatus employed in the embodiment.

The control of the hydraulic circuit, shown in FIG. 4, with the structure described above is carried out by the electronic control unit 5. As indicated by the main flow of the flowchart of FIG. 5, the flow of control begins by determining whether all conditions for starting neutral control are satisfied at a first step S-1.

As described earlier, the conditions are that the D-range is selected in accordance with a signal output by the neutral start switch Sn5, the vehicle speed V is zero, the throttle opening θ is zero and the brake switch Sn6 is turned on. If all the conditions are found satisfied, the flow continues to step S-2 to determine whether the road has a steep gradient by checking the value of a flag FHG. The setting and resetting of the flag FHG will be described later. The judgment at this step is made by a judgment means for releasing the neutral control provided by the invention. The flow then continues to step S-3. At step S-3, the value of the flag FHG is again examined in order to determine whether the road has a gradual gradient. If the gradient is found to be gradual, a timer is set to a predetermined value. The flow then proceeds to step S-4 to wait for the predetermined period of time, for example, 0.001 second to lapse by decrementing the contents of the timer. Step S-4 is carried out in order to avoid hunting which is caused by the fact that the starting conditions hold true frequently when the gradient of the road is found to be gradual.

The flow continues to step S-5 to start hill-hold control independent of the judgment made at step S-3 indicating that the road is gradual.

At the step S-5, a solenoid signal $S_L 2$ is output for closing the solenoid valve 38. Accordingly, in the hydraulic circuit, the hydraulic drain of the solenoid signal pressure oil path 308 is closed and the B-1 switch valve 37 switches to a supply position, starting to apply hydraulic pressure to the hydraulic servo B-1 and starting a piston stroke. The flow then proceeds to step S-6 at which the value of the flag FHG is again examined in order to determine whether the road has a gradual gradient. If the gradient is found to be gradual, a timer is set to a second predetermined value, for example, 1–2 seconds. The flow then proceeds to step S-7 to wait for the period of time, i.e., 1–2 seconds, to lapse by decrementing the contents of the timer. The period of time is a time by which the neutral control is delayed until the brake B-1 is engaged. When the timer value reaches T2, the flow continues to the following step S-8 to enter the neutral control processing whereby control is carried out in accordance with an input torque so that the clutch C1 enters an all but released state at this time. It should be noted that the input torque is computed from map data for the rotation of the engine, i.e., a previously created map (not shown) relates input torque to engine rotation for the appropriate engine. If the gradient is found not to be gradual from the examination of the value of the flag FHG at the step S-6, on the other hand, the flow continues to the step S-8, skipping step S-7 and waiting for the timer to attain T2.

Figure 10:
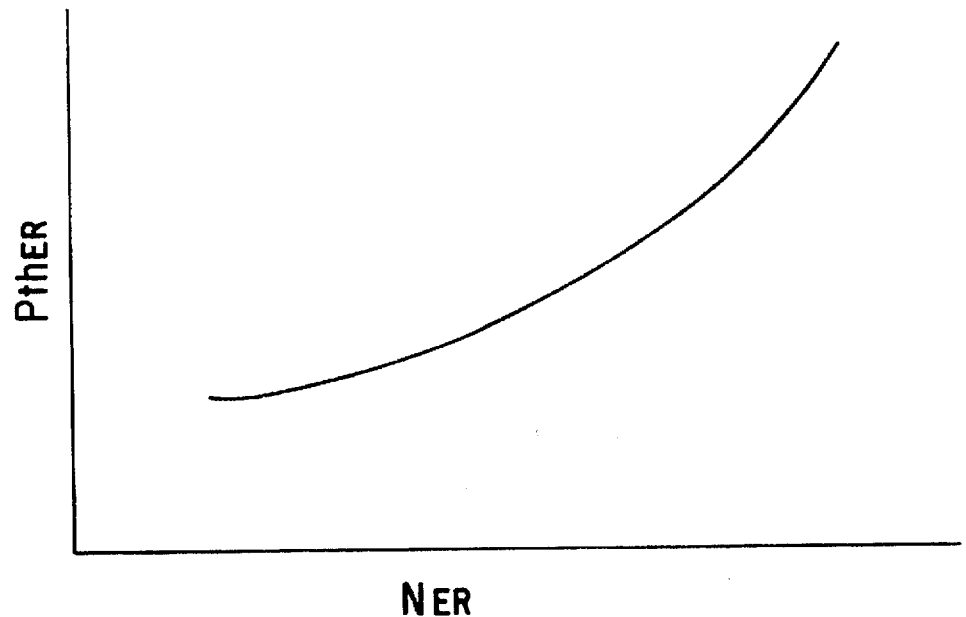
FIG. 10 is an examplary map of the relationship of signal pressure at a given engine rotational speed.

At step S-8, a solenoid signal $S_L 1$ is output for closing the solenoid valve 36. The present rotational speed NE of the engine is set as the rotational speed $N_{ER}$ of the engine at the start of the control. A solenoid signal $S_L T$ is output so that the linear solenoid valve 34 outputs a signal pressure Pth corresponding to the rotational speed $N_{ER}$ of the engine, i.e., $P_{th}$ at $P_{thER}$ (FIG. 10).

Figure 11:
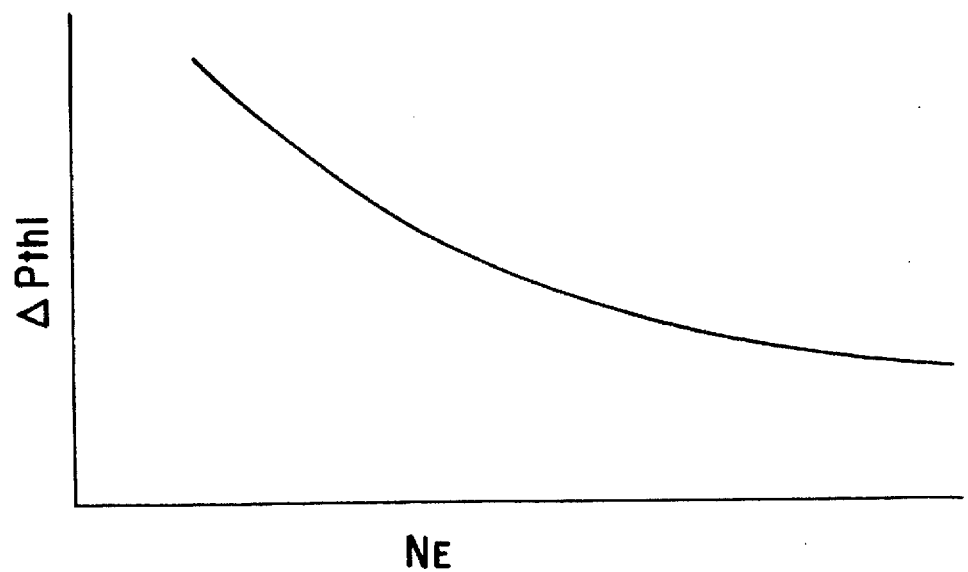
FIG. 11 is an examplary map of the relationship of a change in signal pressure to the present engine rotational speed.

The flow then proceeds to step S-9 to reduce the signal pressure $P_{th}$ for decreasing the hydraulic pressure $P_{C-1}$ applied to the hydraulic servo C-1 at a predetermined gradient by a predetermined amount $\Delta P_{th1}$ is set based on FIG. 11. The predetermined amount $\Delta P_{th1}$ is set to such a value that the hydraulic pressure decreases at the predetermined gradient. At that time, in the hydraulic circuit, the C-1 switch valve 35 is switched to an exhaust position so that the reduction of the hydraulic pressure is carried out under the operation of the C-1 control valve 33 to adjust the hydraulic pressure. The flow then proceeds to step S-10 to determine whether the clutch C1 is in an engaged state by examining whether the input/output rotation ratio e of the torque converter exceeds a predetermined value e1. The judgment at step S-10 is based on signals detected by the engine-rotation sensor Sn2 and the clutch-C1 rotation sensor Sn3. If the outcome of the judgment is YES, the flow continues to a step S-11 to carry out processing to set the throttle pressure $P_{th}$ to a value $P_{thm}$ which places the clutch C1 at an all but released state. This state is sustained until an end condition is detected at the next step S-12.

The end condition is found satisfied at step S-12 if any of the speed of the vehicle is not zero, the throttle opening is not zero or the brake switch is turned off. If the end condition is satisfied, the flow proceeds to the last step S-13 to turn off the solenoid signals $S_L 1$ and $S_L 2$. At that time, the C-1 switch valve 35 is switched to a supply position for the line pressure $P_L$ whereas the B-1 switch valve 37 is switched to an exhaust position for the hydraulic pressure, terminating the neutral control and the hill-hold control. In this way, the clutch C1 is engaged and the automatic transmission returns to the ordinary D range.

Next, the setting of the flag (FHG=2), which is examined at step S-2, will be explained. It should be noted that if FHG=2 is found at step S-2, the flow is terminated without carrying out the neutral control and the hill-hold control according to the principal concepts and notions proposed by the invention in the course of control based on the main flow described above because the hill is excessively steep and clutch creep force is insufficient to hold the vehicle on the hill without the brake being engaged.

Figure 6:
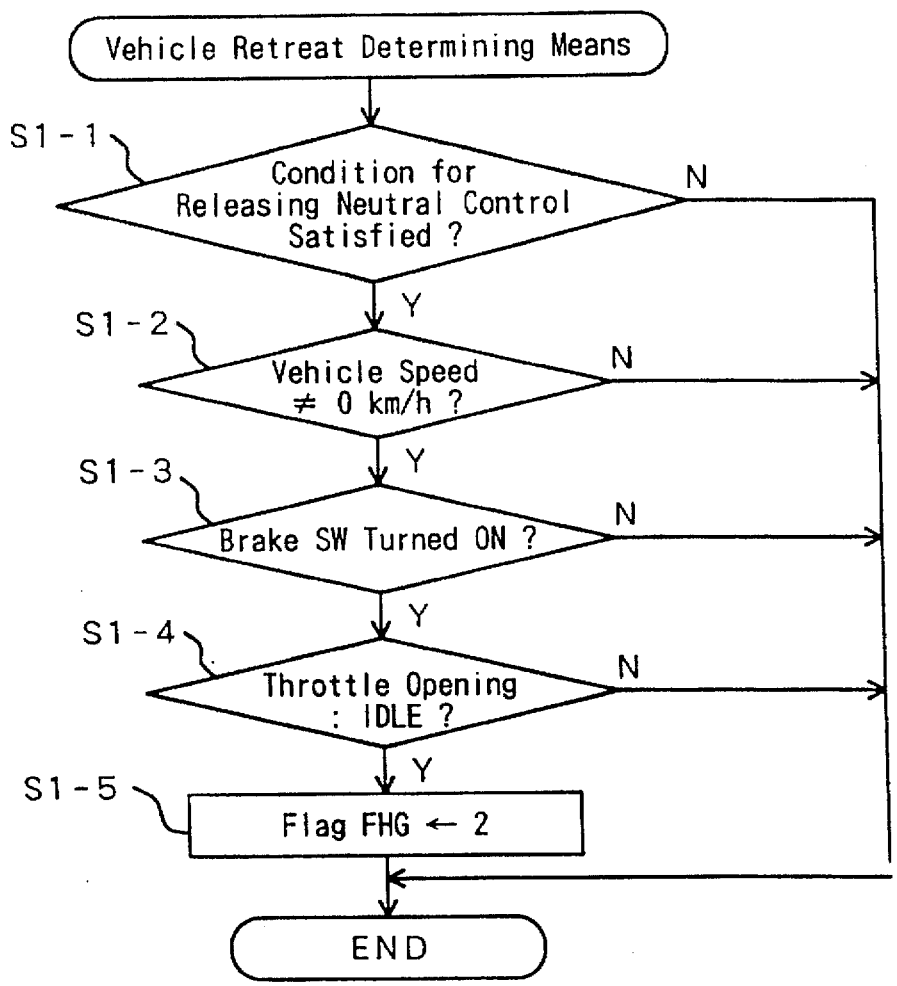
FIG. 6 is a flowchart showing processing to set a flag in the main flow of FIG. 5, the flag is used for indicating the steepness of the gradient of an uphill road.
Figure 7:
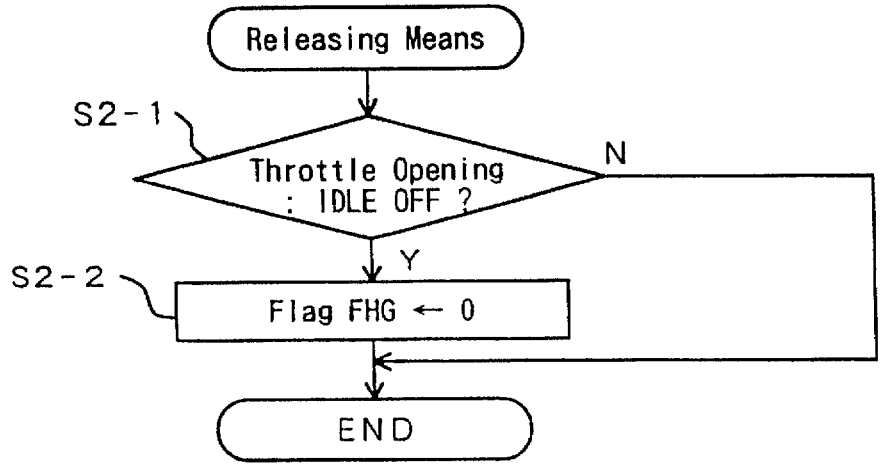
FIG. 7 is a flowchart showing processing to reset the flag in the main flow of FIG. 5.

As shown in FIG. 6, a flowchart for setting FHG=2 begins with a step S1-1 to determine whether a condition for releasing the neutral (N) control holds true. If the outcome of the judgment is YES, the flow continues to a step S1-2 to determine whether the speed of the vehicle is not zero. If the speed of the vehicle is not zero, the flow continues to a step S1-3 to determine whether the brake switch is turned on. If the brake switch is turned on, the flow continues to a step S1-4 to determine whether the throttle opening is zero (idle). If the conditions of the steps S1-2, S1-3 and S1-4 are all found satisfied, indicating that the vehicle has retreated, or rolled back, on a road with a steep gradient, the flow continues to a step S1-5 to set the flag FHG to 2 to indicate a road having a steep gradient (FHG←2). In the method, a technique to release the flag setting (FHG←0) is adopted as a releasing means. As shown in the flowchart of FIG. 7, the flag setting is released when the throttle opening is detected not to be zero any more, as shown by notation IDLE OFF in the figure, during a period between the releasing of the neutral control in the main flow and the start of the next neutral control.

Figure 8:
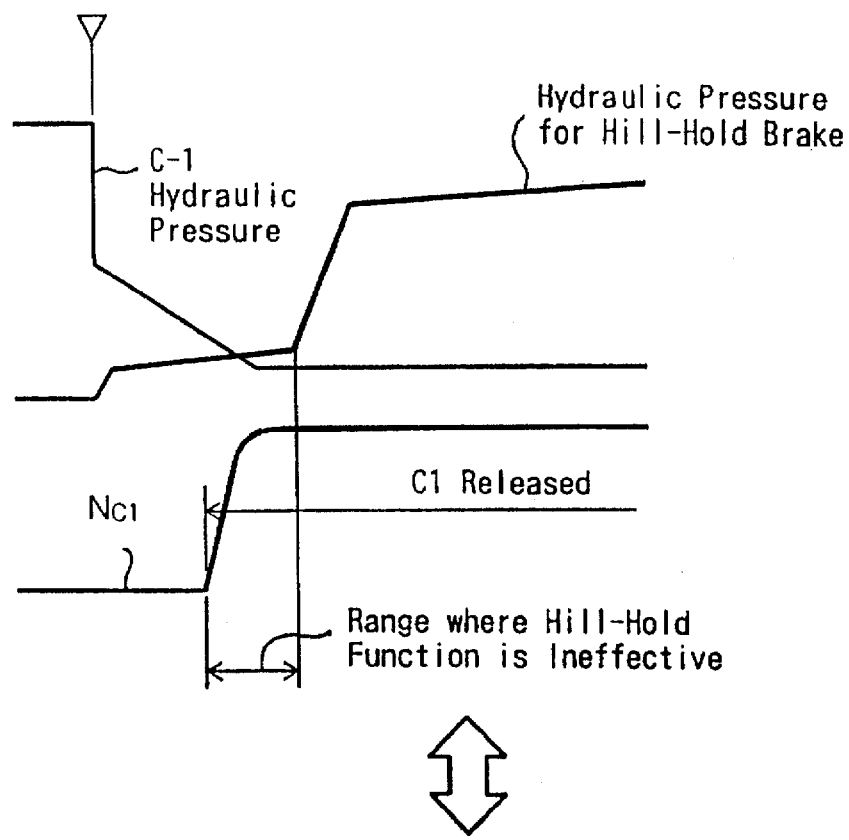
FIG. 8 is a timechart used for comparing control characteristics obtained from the control apparatus of the automatic transmission implemented by the embodiment (bottom portion) with control characteristics obtained from the conventional control apparatus (top portion)
Figure 8:
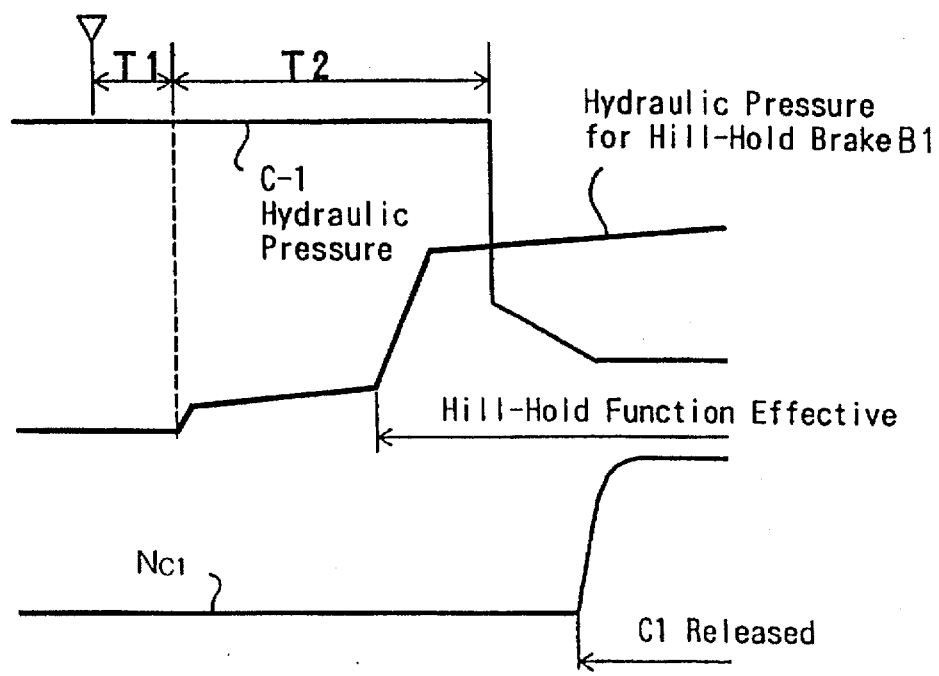

FIG. 8 shows the comparison of a time chart based on the flow described above with a conventional time chart. As shown in the upper half of the figure, according to the conventional control, the starting of the control causes the hydraulic pressure of the brake B1 to follow a course of increasing gradually from a state of a predetermined low value during a period of a piston stroke following the start of the control. However, the hydraulic pressure of the clutch C1 follows a course of decreasing to a fixed value at a stroke as soon as the control is started and then gradually decreases thereafter. Then, in the course of decreasing gradually, the releasing of clutch C1 is started. As a result, a period where the hill-hold function is ineffective is produced between the start of the releasing of the clutch C1 and the start of the engagement of the brake B1.

As shown in the lower half of the figure, on the other hand, according to the control provided by the embodiment as described above, after the timer measurement time T1 has elapsed following the start of the control, the hydraulic pressure of the brake B1 gradually increases during the piston-stroke period from a predetermined low value and, in a short time, the engagement of the brake B1 starts. In the case of a non-uphill road for which the judgment of a gradual gradient does not actually hold true during this period, or in the case of the initial control routine for which the judgment of a gradual gradient does not hold true even if the road is actually a gradual uphill road, much like the conventional control, the hydraulic pressure of the clutch C1 follows a course of decreasing to a fixed value at a stroke as soon as the control is started and then gradually decreases thereafter. If the judgment of a gradual gradient holds true, on the other hand, since the period described above is within a timer measurement time T2, the reduction of the hydraulic pressure of the clutch C1 has not yet been observed. Then, as the timer value attains T2, the hydraulic pressure of the clutch C1 abruptly drops. Afterwards, the releasing of the clutch C1 is started by controlling the release of the hydraulic pressure. As a result, the region in which the hill-hold function is ineffective, as is the case with the conventional technology, no longer exists.

As described above, in brief, in this embodiment, if the vehicle is determined by the judgment means to be on a gradual road, an operation to apply a hydraulic pressure to the second hydraulic servo B-1 is started by the hydraulic pressure applying means. After a predetermined period of time has elapsed, an operation to reduce a hydraulic pressure applied to the first hydraulic servo C-1 is started by the hydraulic pressure reducing means. By the time the clutch C1 is released, the engagement of the brake B1 will have already been completed so that, if the force stepping on the brake pedal is small, the vehicle is prevented from retreating, or rolling back due to the releasing of the clutch C1. As a result, it is possible to judge that the road has a gradual gradient by means of a detection means normally provided in a vehicle having the conventional automatic transmission, which detection means also detects a variety of signals, such as signals indicating the operation of the acceleration pedal, the speed of the vehicle and the operation of the foot brake pedal. Therefore, when the vehicle is not on a road with a gradual gradient, the clutch is released quickly, allowing the effect of reducing the amount of consumed fuel due to the releasing of the clutch to be exhibited to its maximum. In addition, a repetitive vehicle retreat on a road with a gradual gradient can be avoided. When the vehicle is on a road with a steep gradient, the control described above is not carried out, preventing jitter from occurring in the brake B1.

Next, a second embodiment implementing a modified version of the gradient detecting means employed in the first embodiment described above is explained. In the second embodiment, the gradient detecting means comprises an acceleration detecting means for detecting the actual acceleration of the vehicle and a running-state detecting means for detecting the running-state of the vehicle. In such a structure, the judgment means uses information about the running state of the vehicle to calculate a desired acceleration of the vehicle for a flat road. The calculated desired acceleration is compared with an actual acceleration detected by the acceleration detecting means. If the actual acceleration is found to be smaller than the desired acceleration by a difference greater than a predetermined first comparison value (a), the road is determined to be a road having such a steep gradient that a slip of the brake B1 may occur.

If the judgment means finds that the actual acceleration ($ALPHA_A$) is smaller than the desired acceleration ($ALPHA_S$) by a difference not greater than the first comparison value (a) but greater than a predetermined second comparison value (b), the road is determined to be a road having a gradual gradient. It should be noted that the desired acceleration ($ALPHA_S$) is also referred to hereafter as a reference acceleration in the explanation of the embodiment. When the vehicle is detected to be in a stopped state by the stop-state detecting means and when the road is determined to be a gradual road by the judgment means, the execution means permits the hydraulic pressure applying means start to apply a hydraulic pressure to the second hydraulic servo B-1 and, after the predetermined time T2 has elapsed, permits the hydraulic pressure reducing means to start to reduce the hydraulic pressure applied to the first hydraulic means C-1. If the road is judged by the judgment means to be neither steep nor gradual, on the other hand, the execution means permits the hydraulic pressure reducing means to start to reduce the hydraulic pressure applied to the first hydraulic means C-1 and, at the same time, permits the hydraulic pressure applying means to start to apply a hydraulic pressure to the second hydraulic servo B-1 simultaneously. In addition, the predetermined time T2 is set at least to a value equal to the time it takes to complete the engagement of the brake B1 as is the case with the first embodiment.

In addition, the running-state detecting means detects at least the input torque applied to the transmission apparatus, the engaged gear of the transmission apparatus and the speed of the vehicle whereas the judgment means computes the value of the reference acceleration $ALPHA_S$ for a flat road from the input torque, the engaged gear and the speed of the vehicle.

Here, the calculation of the reference acceleration $ALPHA_S$ carried out by the judgment means is explained. First of all, an engine torque is found by linear interpolation based on the throttle opening $\theta$ and the engine rotational speed $N_E$ from the examplary map of FIG. 12. Next, a speed-reduction ratio, which is defined as a ratio of the rotational speed input to the transmission apparatus (from Sn3) to the engine rotational speed (from Sn2), is calculated from the input and output rotational speeds of the transmission apparatuses. A torque ratio corresponding to the speed-reduction ratio is then found from the examplary map of FIG. 13. Subsequently, an input torque of the input transmission apparatus 14 is found by multiplying the engine torque by the torque ratio. The input torque of the first transmission apparatus 14 found in this way is then used for calculating a reference acceleration $ALPHA_S1$ in accordance with the following equation:

ALPHA$_S$1=(Transmission-apparatus input torque×Gear ratio×Diff ratio/Tire diameter−Running resistance on flat road−Gear loss)/Car weight where a running resistance corresponding to the vehicle speed V (see examplary FIG. 14) and a gear loss corresponding to the gear stage are found from the map (see examplary FIG. 15). Then, a reference acceleration ALPHA$_S$2 is found by storing the most recent four values of the reference acceleration ALPHA$_S$1 in a memory unit and calculating an average of the four values and the present value by using the following equation:

ALPHA$_S$2=(ALPHA$_S$1$_{K-4}$+ALPHA$_S$1$_{K-3}$+ALPHA$_S$1$_{K-2}$+ ALPHA$_S$1$_{K-1}$+ALPHA$_S$1$_K$)/5 where the notation k-n used in the above equation denotes an nth previous value.

Then, the reference acceleration ALPHA$_S$ is found by calculation involving a corrected reference acceleration ALPHA$_S$2 and the first previous reference acceleration ALPHA$_{SK-1}$ in accordance with an equation as shown below. A quantity (base offset) used for correcting the reference acceleration ALPHA$_S$2 is found from the examplary map of FIG. 16 by linear interpolation using the gear ratio and the throttle opening.

ALPHA$_S$={ALPHA$_{SK-1}$×3+(ALPHA$_S$2−Base offset)}4

It should be noted that the correction described above is required for compensating for variations in running resistance, gear loss and output torque of the individual engine.

Next, the calculation of the actual acceleration ALPHA$_A$ as carried out by the running-state detecting means is explained. First, the most recent four values of the vehicle speed V are stored in the memory unit and then an actual acceleration ALPHA$_A$1 is found as a weighted average of the values from the previously stored values and the present value of the vehicle speed VK using the following equation:

ALPHA$_A$1=(V$_K$−V$_{K-4}$)×2+(V$_{K-1}$−V$_{K-3}$)

where the values of the vehicle speed are sampled at intervals of 0.1 seconds.

Then, the most recent two values of the actual acceleration ALPHA$_A$1 are stored in the memory unit for use in the calculation of an actual acceleration ALPHA$_A$2 in conjunction with the present value of the actual acceleration ALPHA$_A$1$_K$ in accordance with the following equation:

ALPHA$_A$2=(ALPHA$_A$1$_{K-2}$+ALPHA$_A$1$_{K-1}$+APLHA$_A$1$_K$)/3 where the notation k-n used in the above equation denotes an nth previous value.

Subsequently, the actual acceleration ALPHA$_A$ is found from the first previous value of the actual acceleration ALPHA$_{AK-1}$ and the actual acceleration ALPHA$_A$2 by using the following equation:

ALPHA$_{AK}$=(ALPHA$_{AK-1}$×3+ALPHA$_A$2)/4 where the notation k-n used in the above equation denotes an nth previous value.

The above formulas are discussed in related U.S. patent application Ser. Nos. 08/657,616 and 08/663,980 attorney docket nos. JAO 38230 and JAO 38231, filed May 31, 1996 and Jun. 14, 1996, respectively, the disclosures of which are incorporated by reference herein.

Figure 9:
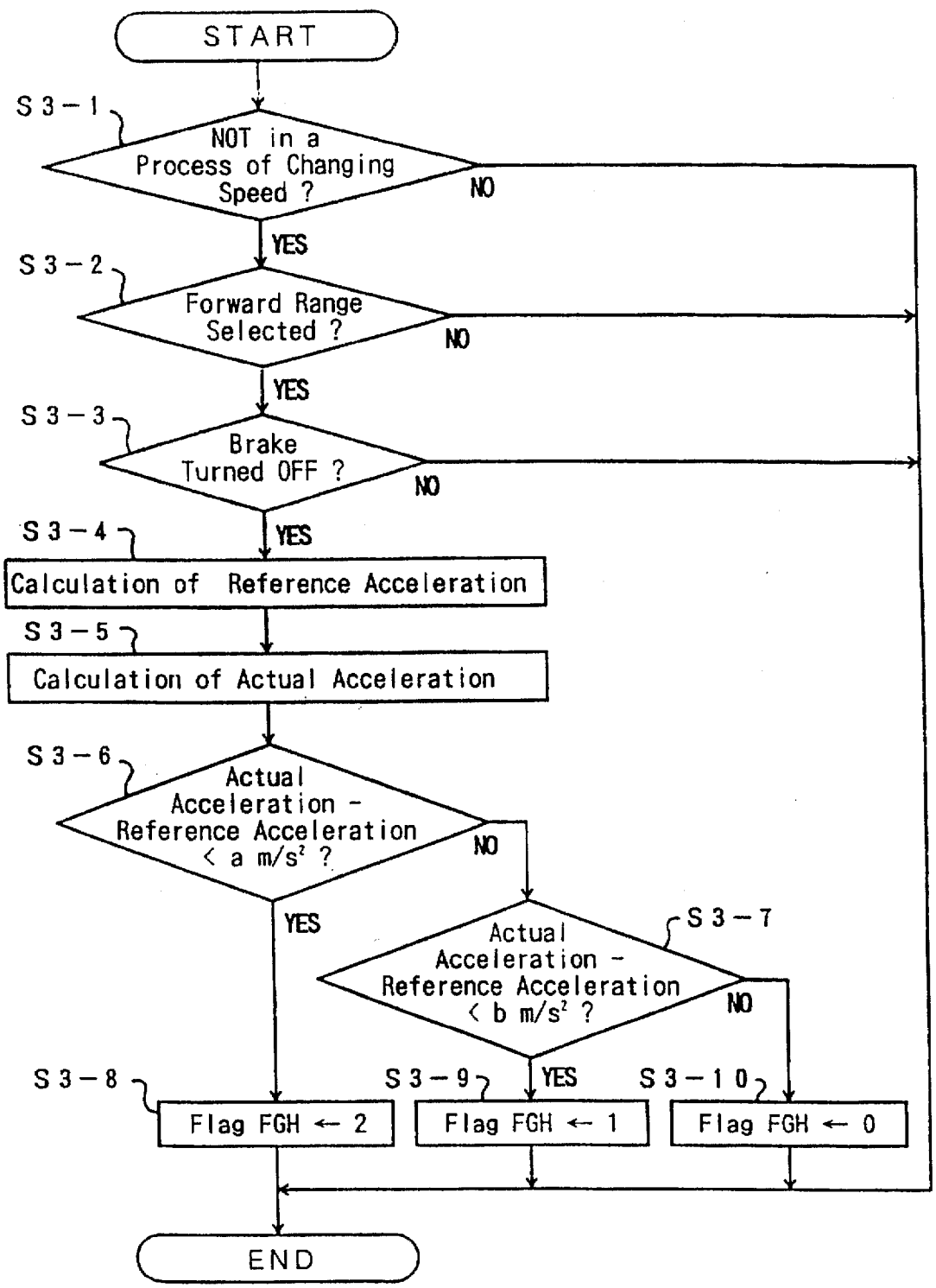
FIG. 9 is a flowchart showing a second embodiment for implementing modified processing to set a flag in the main flow of FIG. 5 that is used for indicating the steepness of the gradient of an uphill road.

FIG. 9 shows a flowchart for the flag setting, including processing carried out by the judgment means to compare the reference acceleration ALPHA$_S$ with the actual acceleration ALPHA$_A$, obtained in this way. First, the flowchart begins with step S3-1 by judging whether the engine is not in a process of changing its speed. If the outcome of seep S3-1 is YES, the flow then proceeds step S3-2 to determine whether a forward range is selected. If the outcome of step S3-2 is YES, the flow then proceeds to step S3-3 to determine if the brake is turned off. If the outcome of step S3-3 is YES, the flow then proceeds to step S3-4 to calculate the reference acceleration ALPHA$_S$ and then to step S3-5 to calculate the actual acceleration ALPHA$_A$. The flow then continues to step S3-6 to compare the difference between the actual acceleration ALPHA$_A$ and the reference acceleration ALPHA$_S$, that is, the difference between the acceleration of the vehicle and the acceleration produced by the engine torque with the first comparison value (a). If the actual acceleration ALPHA$_A$ is found to be smaller than the reference acceleration ALPHA$_S$ by a difference greater than a first comparison value (a), the flow proceeds to step S3-8 to set a value in the flag FHG (FHG←2) to indicate a road with a steep gradient. It should be noted that, in actuality, the difference is negative. The flow thus proceeds from step S3-6 to step S3-8 if the absolute value of the negative difference is large. If the actual acceleration ALPHA$_A$ is smaller than the desired acceleration ALPHA$_S$ by a difference that is not greater than the first comparison value (a) but is greater than a second comparison value (b) in step S3-7, on the other hand, the flow proceeds to step S3-9 to set a value in the flag FHG (FHG←1) to indicate a road with a gradual gradient. Again, the difference is actually negative. The flow thus proceeds from step S3-6 through step S3-7 to step S3-9 if the absolute value of the negative difference is small. In other cases, the flow continues to step S3-10 to reset the flag FHG (FHG←0).

In this way, by using the process shown in the flowchart of FIG. 9 for setting the flag described above, the same control as that of the first embodiment can be implemented. This embodiment is different from the previous one in that, in the case of this embodiment, the gradient of a road can be detected while the vehicle is running so that, by the time the vehicle is stopped and a stop state of the vehicle is detected, the gradient of the road has been determined in advance. Accordingly, a road steep enough to cause the brake B1 to slip will have been identified at that time. As a result, the neutral control and the hill-hold control can be canceled without waiting for the vehicle to actually retreat because of the slipping of the brake B1. As for other points, this embodiment is virtually the same as the first embodiment so that the other points do not have to be explained.

The invention has been explained in detail by describing two embodiments. It should be noted, however, that the scope of the invention is not limited to the two embodiments. That is to say, details of the actual structure can be changed into a variety of versions without deviating from what is described in the claims of the invention. In particular, the signal detecting means is not limited to those means shown in the embodiments. Any signal detecting means can be used as long as it can be used to detect signals which are essentially required, regardless of whether it is a means for directly detecting the operation of the acceleration pedal, the speed of the vehicle and the operation of the foot-brake pedal, or it is a means for detecting signals obtained indirectly from these operations or changes in their states.

What is claimed is:

1. A control apparatus of an automatic transmission of a vehicle, comprising:

a fluid transmission gear for transmitting the rotation of an engine to transmission apparatuses;

a clutch which is engaged when a forward running range is selected to couple said fluid transmission gear to said transmission apparatuses;

a one-way clutch which is locked by engagement of said clutch to achieve a forward 1st gear ratio of said transmission apparatuses;

a brake for locking said one-way clutch by the engagement in order to prevent an output shaft of said transmission apparatuses from rotating in a reverse direction;

a first hydraulic servo for engaging said clutch by a hydraulic pressure applied thereto;

a second hydraulic servo for engaging said brake by a hydraulic pressure applied thereto;

a stop-state detecting means for determining that the vehicle is in a halted state when a speed of the vehicle is virtually zero, an acceleration pedal is released and a foot-brake pedal is stepped on;

a gradient detecting means for detecting the gradient of a road; and a control means for controlling hydraulic pressures applied to said first and second hydraulic servos in accordance with signals generated by said stop-state detecting means and said gradient detecting means, wherein said control means comprises:

a judgment means for determining in accordance with said signal output by said gradient detecting means whether an uphill road is steep enough to cause said brake to slip, with said brake engaged;

a hydraulic pressure reducing means for reducing a hydraulic pressure applied to said first hydraulic servo in order to place said clutch in an all but released state;

a hydraulic pressure applying means for applying a hydraulic pressure to said second hydraulic servo in order to place said brake in an engaged state; and an execution means for permitting said hydraulic pressure reducing means to reduce a hydraulic pressure applied to said first hydraulic servo and said hydraulic pressure applying means to apply a hydraulic pressure to said second hydraulic servo only if a stop state is detected by said stop-state detecting means and said judging means determines that an uphill road is not steep enough to cause said brake to slip.

2. The control apparatus of an automatic transmission according to claim 1, wherein said gradient detecting means comprises:

a vehicle speed detecting means for detecting a vehicle speed;

an acceleration pedal detecting means for detecting a stepped-on state of an acceleration pedal; and a brake detecting means for detecting a stepped-on state of a foot brake, and said judgment means determines that said uphill road is steep enough to cause said brake to slip if, in a state in which said execution means permits a hydraulic pressure applied to said first hydraulic servo to be reduced and a hydraulic pressure to be applied to said second hydraulic servo, said gradient detecting means detects that the vehicle speed has become virtually a non-zero value with said brake pedal stepped on and said acceleration pedal released.

3. The control apparatus of an automatic transmission according to claim 2, wherein when said acceleration-pedal detecting means detects that said acceleration pedal is stepped on, said judgement means abstains from judging that an uphill road is steep enough to cause said brake to slip.

4. The control apparatus of an automatic transmission according to claim 1, wherein said gradient detecting means comprises an acceleration detecting means for detecting an actual acceleration of a vehicle and a running-state detecting means for detecting a running state of said vehicle, and said judgment means carries out the steps of:

calculating a desired acceleration of said vehicle for a flat road in accordance with the running state of the vehicle;

comparing the calculated desired acceleration with the actual acceleration; and determining that an uphill road is steep enough to cause said brake to slip if the actual acceleration is found to be smaller than the calculated desired acceleration by a difference equal to or greater than a predetermined first comparison value.

5. The control apparatus of an automatic transmission according to claim 4, wherein if the actual acceleration is not found smaller than the desired acceleration by a difference equal to or greater than the first comparison value but found smaller than the desired acceleration by a difference equal to or greater than a predetermined second comparison value, said judgment means determines that the uphill road is gradual and, when the vehicle is detected by said stop-state detecting means to be in a halted state, said execution means permits said hydraulic pressure applying means start to apply a hydraulic pressure to said second hydraulic servo and, after a predetermined time has elapsed, permits said hydraulic pressure reducing means to start to reduce a hydraulic pressure applied to said first hydraulic servo if the uphill road is determined by said judgment means to be gradual, or said execution means permits said hydraulic pressure applying means to start to apply a hydraulic pressure to said second hydraulic servo and permits said hydraulic pressure reducing means to start to reduce said hydraulic pressure applied to said first hydraulic servo at the same time if said uphill road is determined by said judgment means to be neither steep nor gradual.

6. The control apparatus of an automatic transmission according to claim 5, wherein the predetermined time is set at a value which is at least as long as a time required by said brake to complete engagement.

7. The control apparatus of an automatic transmission according to claim 4, wherein said actual running-state detecting means at least detects an input torque applied to said transmission apparatuses, an engaged gear of said transmission apparatuses and the speed of the vehicle and said judgment means calculates a desired acceleration of the vehicle for a flat road in accordance with said input torque, said engaged gear of said transmission apparatuses and the speed of said vehicle.

\* \* \* \* \*

UNITED STATES PATENT AND TRADEMARK OFFICE
CERTIFICATE OF CORRECTION

PATENT NO. : 5,741,200
DATED : April 21, 1998
INVENTOR(S) : Takao TANIGUCHI, Kazumasa TSUKAMOTO, Masahiro HAYABUCHI, Masaaki NISHIDA, Hiroshi TSUTSUI, Muneo KUSAFUKA, Masamichi UNOKI, and Junichi NISHIMURA It is certified that error appears in the above-indentified patent and that said Letters Patent is hereby corrected as shown below:

On the title page, in item [56], References Cited "U.S. PATENT DOCUMENTS", please add:

--4,335,428       06/1982       MIKI et al.--.

On the title page, in item [56], References Cited "FOREIGN PATENT DOCUMENTS", please add:

--4223084A       11/1992       GERMANY--;
--57-103958      06/1982       JAPAN--;
--61-099747      05/1986       JAPAN--.

Signed and Sealed this

Eighth Day of December, 1998

Attest:

Attesting Officer

BRUCE LEHMAN

Commissioner of Patents and Trademarks